Dec. 18, 1962  J. R. EARLY ETAL  3,069,530
METHOD OF MAKING CAN BODIES AND APPARATUS THEREFOR
Filed April 17, 1959  6 Sheets-Sheet 1
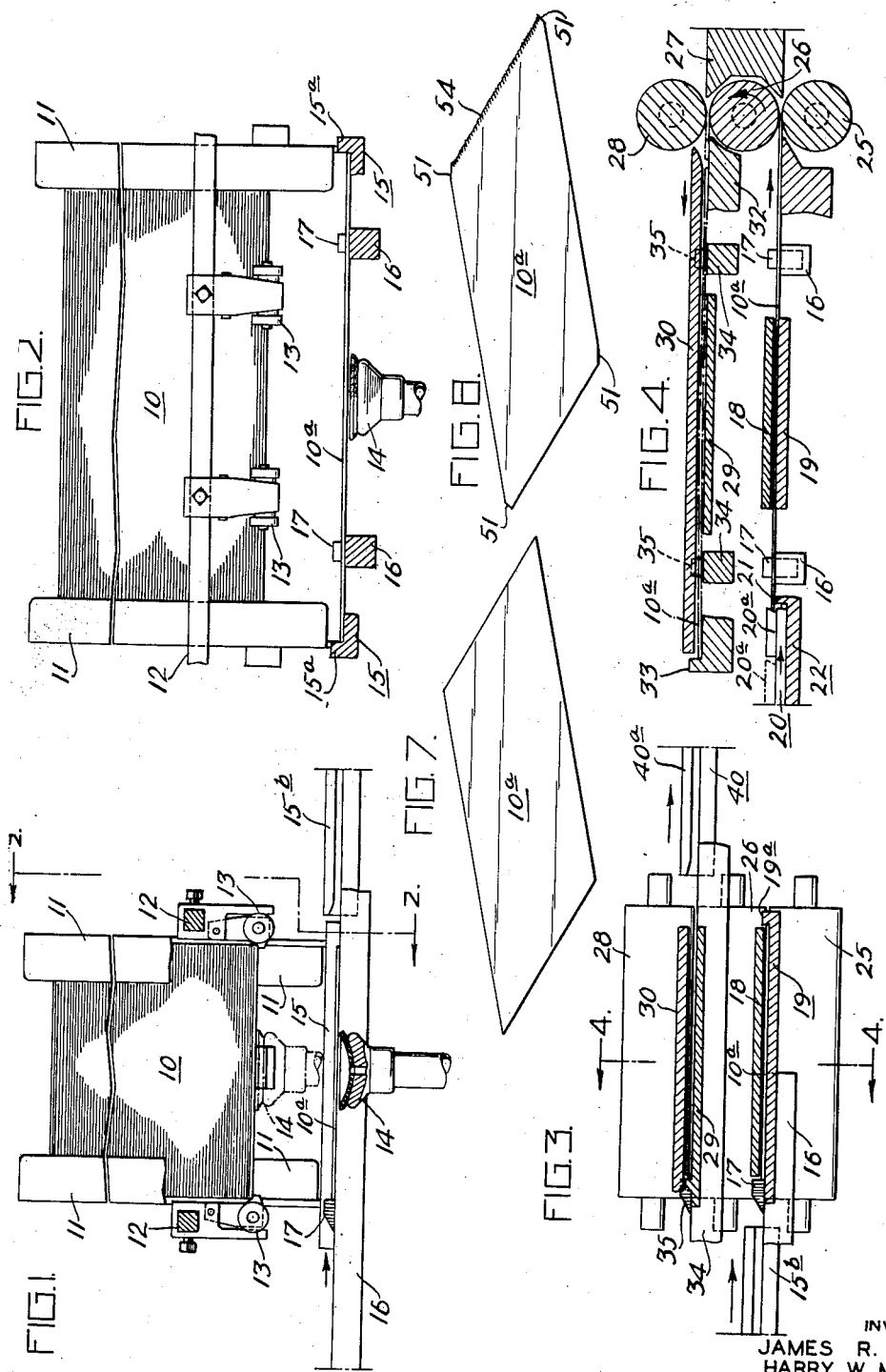
INVENTORS:
JAMES R. EARLY
HARRY W. MORGAN
BY Howson & Howson
ATTYS.

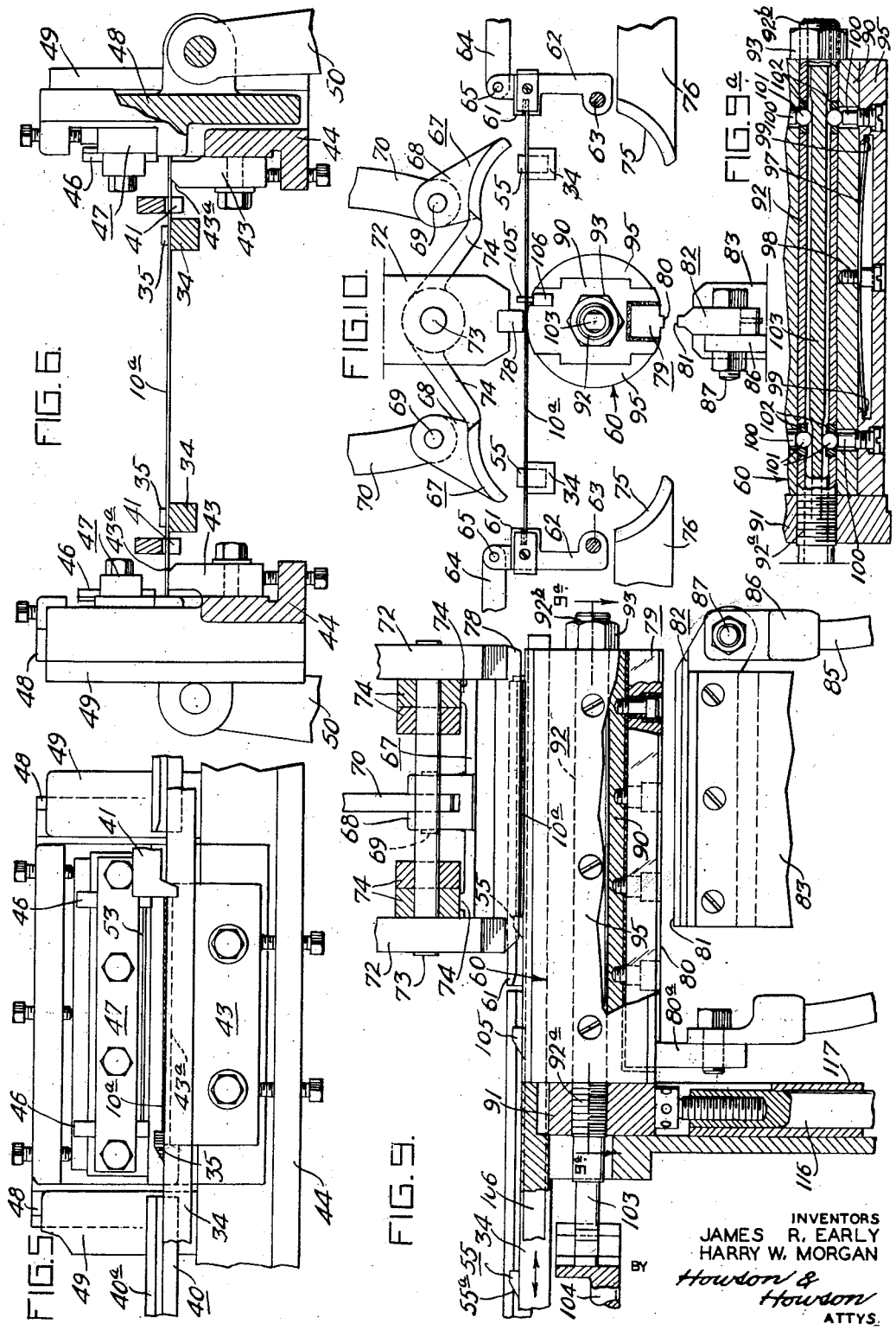

Dec. 18, 1962 J. R. EARLY ETAL 3,069,530
METHOD OF MAKING CAN BODIES AND APPARATUS THEREFOR
Filed April 17, 1959 6 Sheets-Sheet 3
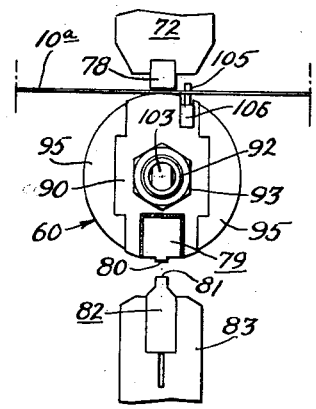
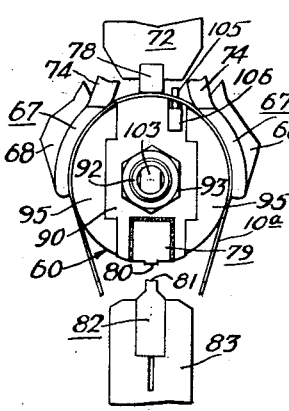
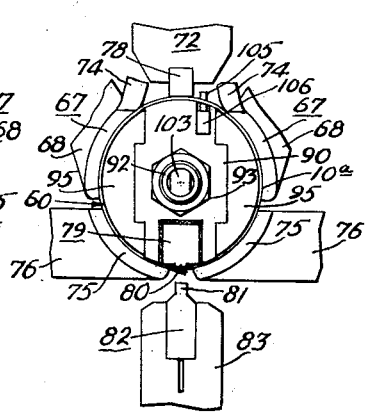
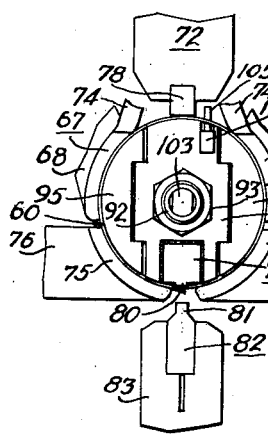
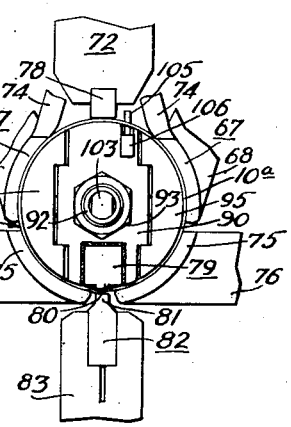
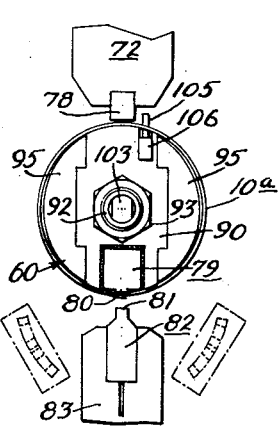
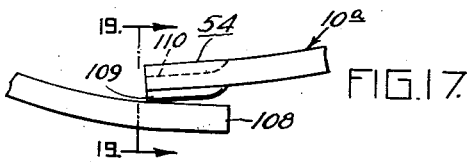
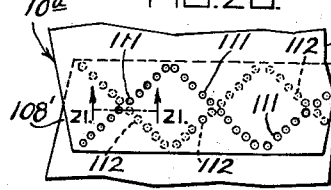
INVENTORS
JAMES R. EARLY
HARRY W. MORGAN
BY Howson & Howson
ATTYS.

Dec. 18, 1962  J. R. EARLY ETAL  3,069,530
METHOD OF MAKING CAN BODIES AND APPARATUS THEREFOR
Filed April 17, 1959  6 Sheets-Sheet 4
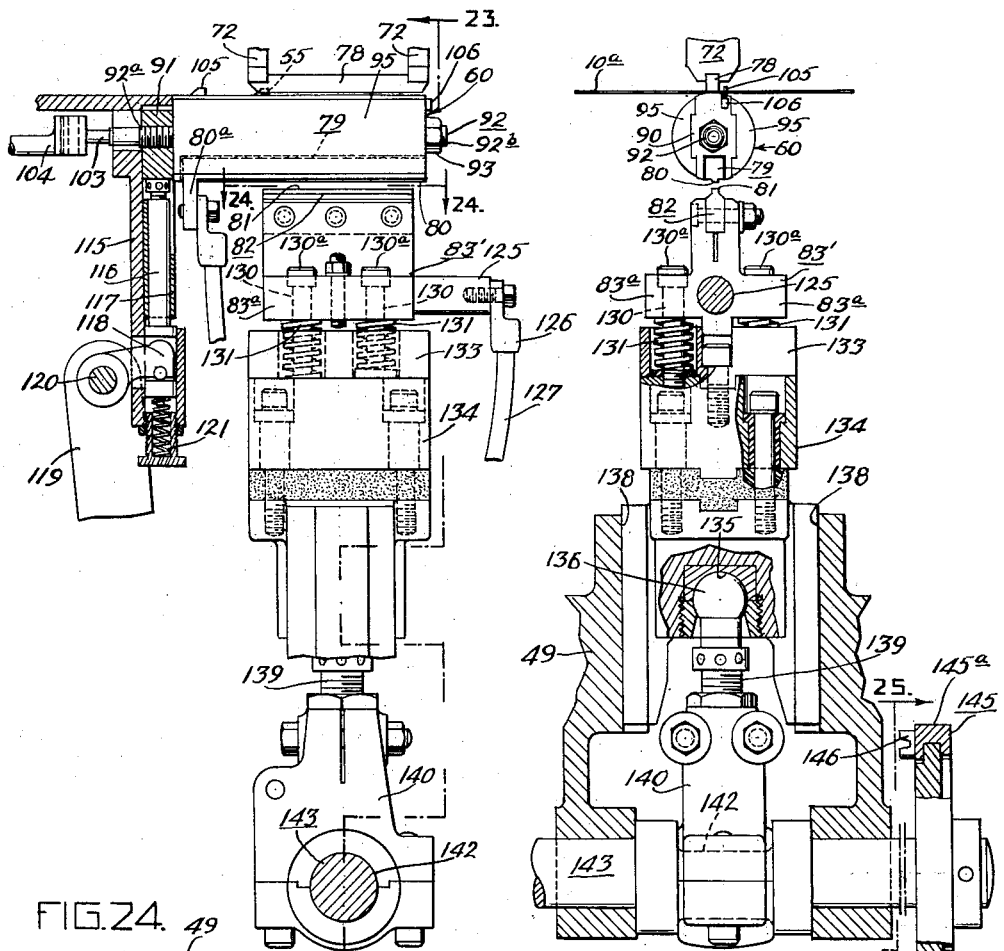
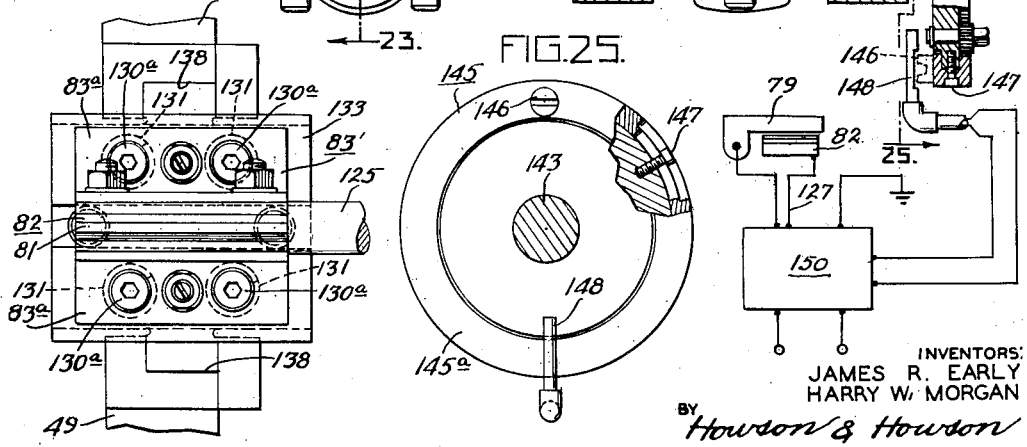
INVENTORS:
JAMES R. EARLY
HARRY W. MORGAN
BY Howson & Howson
ATTYS.

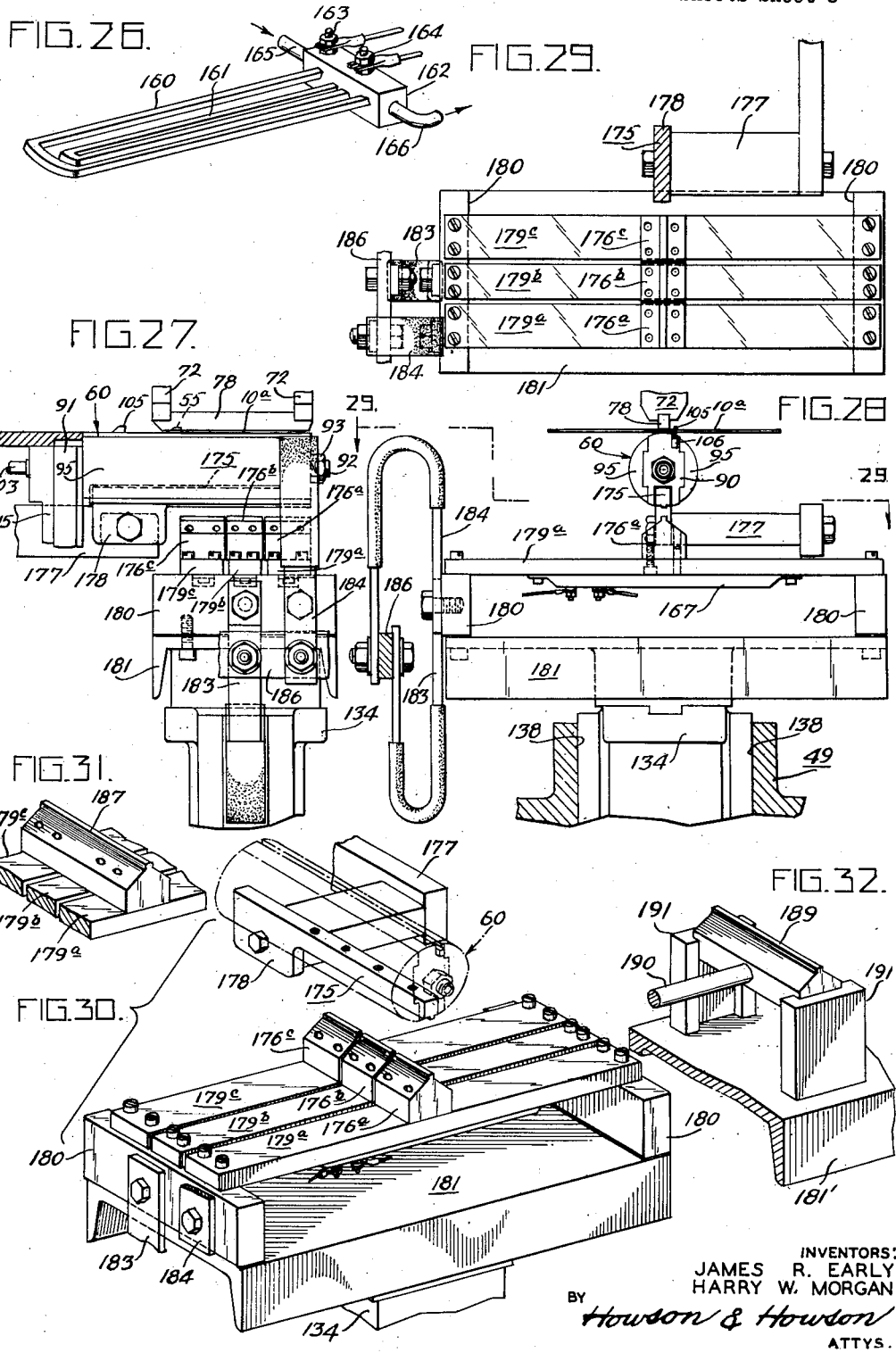

Dec. 18, 1962 J. R. EARLY ETAL 3,069,530
METHOD OF MAKING CAN BODIES AND APPARATUS THEREFOR
Filed April 17, 1959 6 Sheets-Sheet 6

INVENTORS:
JAMES R. EARLY
HARRY W. MORGAN
BY Howson & Howson
ATTYS.

United States Patent Office 3,069,530
Patented Dec. 18, 1962

3,069,530
METHOD OF MAKING CAN BODIES AND APPARATUS THEREFOR
James R. Early, Wynnewood, Pa., and Harry W. Morgan, Wilmington, Del., assignors to Campbell Soup Company, Camden, N.J., a corporation of New Jersey
Filed Apr. 17, 1959, Ser. No. 807,091
14 Claims. (Cl. 219—64)

This invention relates to a method of making elongated welds in sheet metal members. More specifically the present invention is directed to a method of making welded tubular bodies from sheet metal and particularly to the formation of tubular bodies suitable for use in so-called "tin cans." The invention is directed also to apparatus for producing this result.

In the prior art tin cans have been made by first soldering a metal blank together at its opposite edges to provide a tubular body. At one time the ends of the can were also soldered in place, but in recent years this has been eliminated by improved methods of spinning and sealing, using a suitable gasket in each end cap and spinning the edges of the caps over the beiled ends of the body. It has been thought desirable for a long while to eliminate the longitudinal soldered joint in tin cans, but this has not been feasible using a gasket technique such as that devised for the ends of the can. The joint has to pass certain severe pressure tests to prove it air and liquid tight, and it must be of such nature that it will not contaminate the contents of the can, which is commonly food for human consumption.

The objection to a soldered joint stems from several problems. First, the assembly machine necessary for forming body blanks into cylindrical cans is materially longer than would be necessary if the soldering operation could be eliminated. The soldering operation may take much more space than the rest of the forming and handling operation of the can blanks in completed cans. Moreover, the soldering operation is limited as to speed and even when done under perfect conditions tends to produce a number of rejects. Additionally, the use of molten solder and flame in a can machine poses a potential hazard. Cans made in this way are costly from the standpoint of gas and solder consumed. The machines are a source of maintenance trouble for the particular plant or installation in which the can-making machine is located.

The present invention is directed to welding apparatus capable of making longer continuous welds than have heretofore been possible. The welds, unlike many spot welding techniques, because they are continuous, are impervious to food and liquid leakage even under pressure. The welds, moreover, are clean and offer no opportunity for contaminating food. When used in tin cans, the welds not only eliminate all need for soldering but additionally save materially on the amount of sheet metal used by permitting use of a smaller blank for a particular size can.

While the invention has been described in terms of application to tin cans, it will be understood to be broader in its incidence. Most broadly, the present invention is directed to a method of welding sheet material over a substantial length compared with the width of the weld. This is done by selecting opposed electrodes of the length of the desired weld, then superimposing sheet material in position to be welded between the electrodes. Pressure is applied on the sheet material through the electrodes in such a way that the pressure at all points is substantially equal. Then a current of sufficient amperage that the current density over the area of the electrodes will be sufficient to complete the welds is applied for sufficient time to complete the weld.

Structurally, the apparatus of the present invention consists of a welder, including an electrode structure which comprises a pair of elongated electrodes arranged parallel and opposed to one another. Means is provided for moving the electrodes together, and means is provided for supporting one of the electrodes so that it can effectively rotate in the plane of the electrodes relative to its support when the electrodes are brought together. This permits all parts of the rotatable electrode to bear with equal pressure against all parts of the other electrode.

In specific preferred embodiments, the method of welding and the electrode assembly apply to the making of tin can bodies. Details of the preferred embodiment of the present invention can be seen by reference to the following drawings of a can body making machine of the present invention, in which:

FIG. 1 is an elevational view partially in section of a feed mechanism for feeding tin can body blanks one at a time to a conveyor;

FIG. 2 is a view taken along line 2—2 of FIG. 1;

FIG. 3 illustrates in a longitudinal sectional elevation the blank-flexing portion of a typical can body making machine;

FIG. 4 is a view taken along line 4—4 of FIG. 3;

FIG. 5 is an elevational view of the punching and edge forming part of the machine showing details of the feed mechanism for feeding blanks to the electrode assembly;

FIG. 6 is a transverse view of the conveyor section of the machine in the area of FIG. 5;

FIG. 7 is a perspective view of the blank before it is formed;

FIG. 8 is a perspective view of the same blank after its edges have been fabricated by the device of FIGS. 5 and 6;

FIG. 9 shows the structure in the region of the electrodes;

FIG. 9a is a partial sectional view of the can-forming mandrel;

FIG. 10 is an end view of the machine showing its novel electrode structure;

FIG. 11 shows somewhat schematically the first step in forming a can;

FIG. 12 shows the can formed partially around a mandrel;

FIG. 13 shows completion of the forming of a can around the mandrel;

FIG. 14 shows the expansion of the mandrel with the formed can body;

FIG. 15 shows the electrodes brought into contact with one another;

FIG. 16 shows the separation of the electrodes and the release of the forming means from the mandrel;

FIG. 17 is an enlarged view showing the region of contact between the edges of the can;

FIG. 18 shows in detail the region of the weld in the area of the electrodes;

FIG. 19 shows in detail one pattern of limited contact arrangement at the edges of a can blank taken on line 19—19 of FIG. 17;

FIG. 20 shows another pattern of limited contact arrangement;

FIG. 21 shows still another pattern of limited contact arrangement taken on line 21—21 on FIG. 20;

FIG. 22 shows one type of actuation mechanism for the electrode assembly;

FIG. 23 is a view taken along line 23—23 of FIG. 22;

FIG. 24 is a view taken along line 24—24 of FIG. 22;

FIG. 25 is a view of a timing wheel taken along line 25—25 of FIG. 23;

FIG. 26 is a view showing a heater element for use with the lower electrode assembly;

FIG. 27 shows another arrangement for mounting the electrodes involving the use of torsion bars;

FIG. 28 is a front elevational view of FIG. 27;

FIG. 29 is a view of FIG. 28 along line 29—29;

FIG. 30 is a perspective view of the mounting of the electrodes in FIG. 27;

FIG. 31 is a perspective view of a modification of the mounting of the electrodes;

FIG. 32 is a perspective view of another modification of the mounting of the electrodes;

Figure 33:
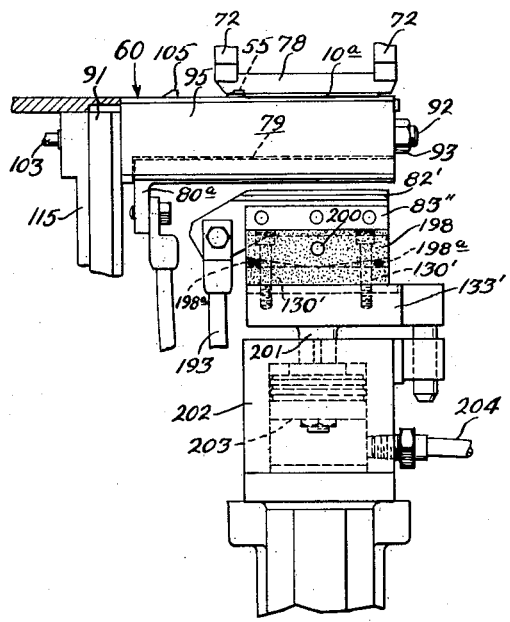
FIG. 33 shows a modified electrode structure, the lower electrode of which has a fluid cylinder actuation system.

Referring to the drawings, the machine as it will be described is in some degree relatively conventional and similar to that used in soldering machines. For example, the structure shown in FIGS. 1 and 2 shows conventional means for stacking sheet material to be formed in the can bodies and means for withdrawing sheets from the bottom of the stack and placing them on the conveyors. FIGS. 3 and 4 are conventional flexing apparatus common to all can-making machinery. FIGS. 5 and 6 are conventional in part in that in all can-making machinery at the present time the corners are cut from the cans to facilitate spinning of the ends for attachment of end covers. From FIG. 7 onward, however, for the most part the structure is non-conventional and directed to a novel welding electrode arrangement and associated mechanical apparatus. Various types of electrode mountings and cooling arrangements are shown as well as a variety of actuation means for producing operation of the assembly. The actual forming of the can bodies is also shown in step-by-step arrangement from FIGS. 11 through FIGS. 16 with details shown in FIGS. 17 through 21.

Referring first to FIGS. 1 and 2, there is shown a conventional means of handling the stack 10 of can blanks of sheet metal. These blanks are guided at their four corners by vertically arranged angle iron members 11 forming corner posts which are preferably horizontally adjustable to accommodate blanks of different sizes. At opposite sides of the stack mounted on support bars 12 are conventional holding elements 13 which are adapted to permit the release of a single sheet at a time. Suction cup 14 which is attached to a suitable pump is mounted for vertical movement from the position shown in full lines in FIGS. 1 and 2 to the position shown in dashed lines in FIG. 1, thereby to pull down a blank at a time from the stack onto the pair of laterally spaced track members 15 which have their sheet supporting top surfaces just slightly above the top of the suction cup 14 in its lowest position, as shown in full lines. The members 15 have upwardly extending flanges 15a which provide a guiding slot for the individual blanks. The blanks move by virtue of the oscillatory movement of bars 16 which carry blank-engaging stops 17 adapted to engage the end of a sheet. The movement of the bars 16 is synchronized with the movement of the suction cup 14 such that, after a blank 10a (see FIG. 7) is withdrawn from the stack down onto the tracks 15, the stops move in the direction shown by the arrow in FIG. 1 to advance the blank to its next station as illustrated by FIGS. 3 and 4.

After one sheet is moved from the stage of FIGS. 1 and 2 to the stage of FIGS. 3 and 4, the bars 16 are retracted so that the stops 17 are in position to move the next blank forward.

As shown in FIGS. 3 and 4, as the blank is moved from the position shown in FIGS. 1 and 2 into the position shown in FIGS. 3 and 4, the carrying bars 16 move the blanks beyond the ends of the guides 15b and between a pair of horizontal holding plates 18 and 19 and against upwardly extending stop 19a on the end of bottom plate 19. These plates support the blank 10a as the bars 17 are withdrawn and, as shown in FIG. 4, a laterally moving horizontal slide member 20, moving in the direction shown by the arrow moves against the lateral edge of the blank 10a which is supported by the upright flange 21 of a guide 22 for slide member 20. Slide member 20 need move only a small distance to shove the blank into the nip of rollers 25—26, as shown by the dotted and solid line illustration of end positions of the pusher element 20a. Roller 26 is driven in the direction shown by the arrow, and, once in the nip, the blank is drawn in the direction shown by the arrows and tends to assume the shape and form of the roller 26. Member 27 performs a certain amount of guiding function but is generally present for protection of the machine operator. The material then passes between the nip of rollers 26 and 28 and on between horizontal plates 29 and 30 corresponding to plates 19 and 18 on a lower level. The sheet so flexed in passing around roller 26 tends to be straightened out against platform 32 and the extended edge of plate 30. By the time its trailing edge clears the roller 26—28, blank 10a lies between the plates 29 and 30. Blank 10a is limited in its horizontal lateral movement by stop 33 which provides a shoulder against which its leading edge tends to abut. From this position, the blanks flexed and with strains relieved are moved by bars 34 under the urging of stops 35 again in the longitudinal direction.

As the blanks 10a are moved along from the upper position shown in FIGS. 3 and 4, they are guided by a pair of members 40 having flanges 40a overlying the top of the sheets. Movement is occasioned by movement of bars 34 whereby stops 35 carry each blank 10a along in the direction of the arrow indicated in FIG. 3 above flange 40a.

Movement of the blank by bars 34 under the urging of stops 35 terminates when the blank is in the position shown in FIG. 5. In this position, the blank abuts against stops 41 with its lateral edges overlying die members 43 which are appropriately bolted to the frame 44. The frame is preferably the same frame structure on which the structure of FIGS. 1, 2, 3 and 4 is supported. Each die 43 is provided with chamfered edges 43a at opposite ends. Cooperating with these chamfered edges 43a of the dies 43 are punches 46 which are held in place by a suitable mounting assembly, generally designated 47, in vertically slidable plates 48 which are moved relative to a channeled slide 49 in the frame by suitable actuating mechanism including linkage elements 50. This vertical movement permits the punches 46 and the chamfered edges of the dies 43a to engage and trim the corners 51 as shown in FIG. 8. One or both of the punch supporting structures 47 also supports an embossing punch 53 which cooperates with an embossing die positioned on the top of die 43 to emboss at least one edge 54 in a manner which will be further discussed in connection with FIGS. 17 through 21. The punches and dies in each case, of course, may be interchanged, as may be the operating mechanism, without materially modifying the effect or operation of the machine.

As the punch descends, the bars 34 are preferably withdrawn, leaving the sheet 10a in position for action by the die set. At the same time, the stop 35 is withdrawn. A similar stop 55 also on bars 34 is drawn back beneath the sheet 10a which is then held in place by the action of the die and punch and which is capable of sliding under the sheet by virtue of the inclined surface 55a at the back of the stop (see FIG. 9). When punching is completed, the stop 55 is then in position to push the sheet forward into the region of FIG. 9 and eventually out over the forming mandrel, generally designated 60. As can be seen in FIG. 10, as the stops on bars 34 move the sheet 10a into position over the mandrel 60, the edges of the sheet are engaged in slotted guiding strips 61 which are supported on arms 62 rotatable about fixed pivot supports 63. The arms 62, and hence the groove holding means 61, are movable outwardly by outward movement of linkages 64 pivoted to arms 62 at points 65, and thereby release the edges of the blank 10a.

Also cooperating with the mandrel are a pair of forming wings 67 which are provided at the back surfaces with suitable flanges 68 for pivotal connection by pins 69 to linkage members 70. Linkage members 70 provide motion toward and away from the forming mandrel. The wings 67 are supported relative to frame portions 72 by rod 73 to which arms 74 of wing members 67 are connected. By essentially vertical motion through linkage members 70, rotation of wing members occurs about pivot rod 73.

Conforming to a lower part of the mandrel 60 are a pair of curved plates 75 which are supported on suitable means 76 for moving them laterally, inwardly and outwardly toward and away from the mandrel.

Above the mandrel is a holding member 78 which, in the course of actuation of the other members, is brought down against the top of the mandrel to hold the blank in position as its lateral supports 61 are withdrawn. At the bottom of the mandrel, and as part of the mandrel, is the welding electrode 79 which is an elongated continuous bar with a downwardly projecting, central ridged portion 80 extending the length of the electrode and mating with ridged portion 81 of lower electrode 82. Electrode 82 is supported on the frame structure through an intermediate member 83 to which it is connected through suitable insulating means. As seen in FIG. 9, the electrode 79 is advantageously L-shaped having a downwardly projecting termination 80a at the supported end of the mandrel behind the region in which the can body is formed. To electrode 82 is connected lead 85 by terminal 86, using bolt 87 or other suitable connecting means. The nature of the support and the electrical arrangement will be considered again hereafter.

Referring to FIGS. 9a and 10, it will be seen that the mandrel 60 consists of a center core 90 held in place against a backing plate 91 on the frame by a tubular member 92 which has threaded end portions 92a and 92b, one of which is threaded into the plate and one of which receives nut 93 holding the core portion 90 in place. At each side of the center core portion 90 are laterally outwardly movable cheeks 95 which are keyed to the core, as can be seen in FIG. 10. The cheeks are held to the core by means of leaf springs 97 which are fastened by bolt 98 to core member 90 and whose ends engage undercut shoulders 99 within a spring accommodating groove on the internal surface of each cheek. Pins 100 extending inwardly from members 95 through large openings in the core member 90 into engagement with ball members 101 in suitable bearings 102. These balls in turn bear against a slide rod 103 which is retractable toward the supported end of the mandrel by suitable linkage to connection means 104. As can be seen in FIG. 9a, the side rod is provided with different diameters so that withdrawal in the direction of the supported end of the mandrel causes larger diameter portions to engage and force apart the balls 101 and hence the pins 100, thus urging outwardly the cheeks 95 against the action of springs 97.

The steps in the can body formation may be visualized by reference to FIGS. 11 through 16, which schematically show these parts illustrated in FIG. 10 participating in the actual forming operation. FIG. 11 shows blank 10a in position above the mandrel while it is still engaged by edge supports 61 but after the stop 55 has been withdrawn from the position shown in dotted lines on FIG. 9 to the position shown in solid lines so that bars 34 will not interfere with the forming of the can body.

As seen in FIG. 12, the holding member 78 is brought into contact with the blank as the edges of the blank are withdrawn and as the wings 67 descend against the cylindrical surface of the mandrel 60 and specifically against the side portions thereof, thereby forming the blank against the mandrel.

FIG. 13 shows completion of the formation of the cylinder by the inward movement of members 75 so that edges of the blank 10a overlap. The linkages which produce motion of the various elements are preferably coupled together such that, as shown in FIG. 14, immediately upon the formation of the can, the cheeks 95 are expanded outwardly from core 90 to somewhat enlarge the diameter of the can. As previously described, this is accomplished by withdrawal of member 103 which may also be due to a common linkage connection. It will be obvious that as the members 95 spread outwardly, the amount of overlap at the edge of the can is reduced.

The next step, as seen in FIG. 15, is bringing together the electrodes 79 and 82, and particularly their contact surfaces 80 and 81 into engagement with opposite sides of the lap joint. When this is completed, and even presure is applied between the electrodes, the welding is commenced by applying the necessary current to obtain adequate current density for the welding effect.

Finally, as seen in FIG. 16, all of the holding and forming elements 78, 67, 75 and 82 are withdrawn so that the welded can body is left on the mandrel without contact with its outer surface and the cheeks 95 thereof are collapsed, leaving the cylinder relatively loose on the mandrel body. At this point another blank is advanced into place through the mandrel, and the cylindrical body is shoved outwardly by stop 105 on slide 106. Slide 106 moves in core 90 of the mandrel and is properly synchronized by virtue of coupling with the actuation system and thus tends to drive the completed can body off the end of the mandrel only after its completion.

In order to complete a weld of the type required in this application, elongated electrodes, long with respect to the width of the welded joint to be formed, are provided on contacting surfaces 80 and 81. These electrodes must at least be as long as the weld which is desired and may be slightly longer. The electrodes also must be adapted to hold the lapped edges of the blank firmly between them, as shown in FIG. 18, and apply uniform pressure over the length of the proposed weld. The electrodes must be capable of supplying current of sufficient magnitude to provide the required current density to produce the extremely long weld and must be of a configuration to permit distribution of the current evenly throughout the length of the weld in order to obtain a uniformly perfect weld. The large currents and high resistances encountered at the welding surfaces make highly desirable the cooling of the electrodes and an adequate cooling system must be provided. Additionally, the electrodes must, like the mandrel, be supported in such a way that the completed cylindrical body can be removed from one end of the mandrel without interference of any supporting or connecting structure.

As previously mentioned, at least one edge 54 of the blank 10a is embossed to provide along the edge relatively small areas of contact periodically. This effect is seen in FIGS. 17 and 18 wherein edge 54 is embossed but edge 108 is plain. The embossing in this case produces ridges 109 running inwardly from the edge on the side of edge 54 which contacts edge 108. Corresponding grooves 110 in the opposite surface of the sheet from the ridges are formed by the embossing process. In other embodiments, such as that shown in FIG. 20, the embossing may take the form of points rather than ridges and, if preferred as shown, both edges may be embossed. As shown, edge 54' is provided with a zig-zag row 111 of point contact embossing. Edge 108' is provided with a similar zig-zag row 112 arranged so that when overlapped with the pattern along edge 54' its pattern is 180° out of phase.

The relatively small contact area increases the resistance in the current path between the electrodes so that the points or ridges tend to melt at their tips and commence the flow of material which must produce the weld. Once started, the flow will continue and produce a satisfactory weld, if the pressure along the entire electrode is uniform and the current density is uniformly distributed. To enhance the welding conditions a suitable welding flux may be used and applied by automatically fed brushes preferably after embossing.

Conventional current supplies and welding equipment may be used in order to provide the necessary current.

Referring now to FIGS. 22 and 23, there is illustrated some of the structure which makes the device of the present invention operable. As can be seen from FIG. 22, support member 91 for the mandrel is not really a solid portion of the frame but is vertically slidable relative to frame portion 115. This is accomplished by virtue of the rod 116 which moves in a sleeve 117 fixed relative to the frame under the urging of pressure-applying element 118 driven by arm 119 through pivotal connection 120. Member 118 is biased so that it is urged upwardly by spring 121. When urged into its uppermost position by movement of member 119, the mandrel 60 bears against the holding member 78, thus clamping the sheet 10a between the mandrel and the holding member. In the arrangement illustrated, the electrical connection to the electrode assembly is somewhat modified, electrical connection being made through rod 125 by virtue of terminal 126 on the end of lead 127. Rod 125 is in turn embedded in conductive support 83' into which electrode 82 is fixed by bolts or otherwise. Electrode support 83 has laterally extending flanges 83a which are penetrated by guide pins 130 terminated at their tops by heads 130a providing shoulders against which the flanges 83a abut. Helical springs 131 are distributed in pockets in base member 133 into the bottom of which are threaded the guide pins 130. The whole base portion 134 may be a relatively massive member terminated at its bottom in a socket 135 for receiving the ball 136 of a universal joint. The lower part of the base portion may be received within a guide portion 138 of the frame 49 to assure general vertical orientation. The ball portion 136 of the universal joint is connected to an adjustable shaft 139 which in turn is connected to a bushing supporting member 140 which holds bushing 141 engaging an eccentric portion 142 of shaft 143 having bearings in the frame 49. The effect of this arrangement is to provide an oscillatory vertical movement through the means of a drive member (not shown) on one end of the shaft. The various connection means, linkages, drive and connecting rods, etc., which synchronize the movement of the parts and provide the synchronized movements illustrated in FIGS. 11 through 15 may be actuated by the same shaft or through other shafts synchronized therewith. Also on shaft 143 is a timing wheel 145 on the periphery of which are provided switch closing means.

FIG. 25 shows a wheel arrangement also shown in FIG. 23 which may be used to synchronize the flow of welding current with the mechanical movements of the can body forming system. As can be seen in FIG. 25 where wheel 145 on shaft 143 has an adjustable rim 145a which carries a magnet 146, movement of the magnet with respect to the wheel 145 can be adjusted by loosening a screw 147 which lies in a slot in rim 145a and has a shoulder against which screw 147 tightens after its position has been fixed. Since the position of wheel 145 is fixed relative to shaft 143, a particular point on the wheel always passes the magnetically actuated switch 148 on a particular position of the shaft corresponding to a particular condition in the system being sequenced. Thus adjustment of the rim 145a effectively repositions the magnet 146 and advances or retards its time of firing. The switch 148 merely initiates operation of the welder system 150 which is otherwise adjusted to determine the amount and length of duration of welding currents by conventional means. It will be immediately obvious that many other types of switching might be substituted here.

FIG. 26 shows a heater element used to elevate the temperature of the electrode 82 to facilitate welding. The heater element pictured in FIG. 26 consists of a pair of U-shaped resistance elements 160, 161, one inside the other and arranged generally in a common plane. These elements are usually positioned below the lower electrode support to lie in a horizontal plane. Their ends are embedded in insulating block 162 wherein element 160 is connected in series with element 161. The ends which are not internally connected together are connected to terminals 163, 164 to which electrical leads which supply heating energy to the unit are located. Through the block 162 passes a channel through which coolant entering from tubing 165 and leaving from tubing 166 is circulated to avoid overheating the insulator. The unit is preferably enclosed by a cover 167 such as is shown in FIGS. 28 and 30.

FIGS. 27–30, 31 and 32 show modified electrode arrangements. FIGS. 27–30 in particular show a modified form of electrode arrangement wherein upper electrodes 175 on the can body form mandrel 60 is essentially unmodified. The lower electrode, however, is divided into segments 176a, 176b and 176c, each electrode segment consisting of a solid block having a top ridge parallel and opposed to the active portion of electrode 175. The electrode 175 is mounted in cantilever fashion upon the mandrel and is connected to the welding current supplying transformer by heavy conductive bar type connection members 177 from its rear end through an enlarged area 178 to which it is bolted or otherwise suitably conductively affixed. Each of the lower electrode segments 176a, 176b, 176c is supported on and conductively affixed to torsion bar members 179a, 179b, 179c, of copper or other flexible material supported between end support members 180 atop a piece of channel shaped insulation material 181. To provide a high current density path to all parts of the torsion bar assembly, flexible metal straps 183 and 184 are connected to one of the connecting members 180, at one end onto a conductive bus bar 186. At the other end, the support structure beneath channel 181 may consist of a conventional base 134 and guide portion 138 within the frame housing 49.

Other modifications of the lower electrode are shown in FIGS. 31 and 32. In FIG. 31, a torsion bar assembly made up of bars 179a, 179b and 179c supports a single solid electrode 187 instead of the segmented arrangement of FIG. 30.

In FIG. 32, lower electrode 189 is pivotally supported transverse to its mid-section on rotatable shaft 190. Its ends are engaged in channels 191 which permit sliding and slight rotation in order to adjust the pressure. Base 181' may be similar to that shown in FIG. 3.

It will be apparent to those skilled in the art that all forms of lower electrode shown have as common object the application of a substantial amount of pressure evenly applied in opposition to the top electrode in order to create a uniform resistance to current flow along the length of the electrodes.

Figure 34:
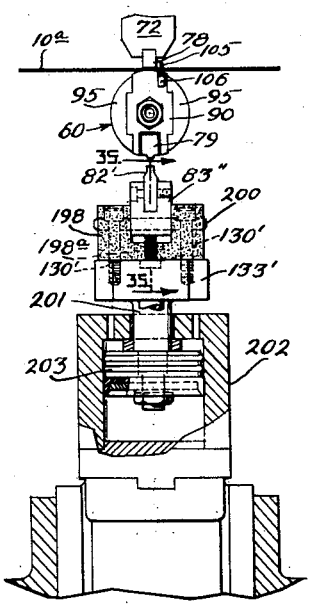
FIG. 34 shows a front elevation of the structure of FIG. 33 partially in section.
Figure 35:
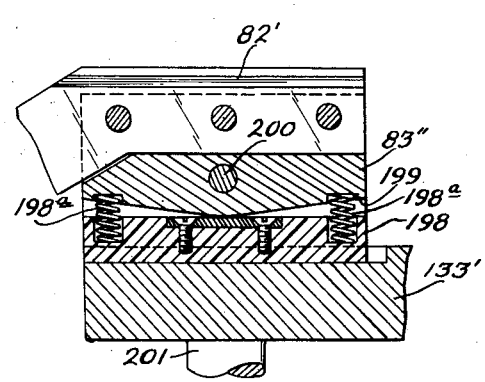
FIG. 35 is a sectional view taken along lines 35—35 in FIG. 34.

FIGS. 33 through 35 show still another electrode mounting arrangement directed to the same ends. In this case the lead through the lower electrode 193 is taken off much in the same way as in the structure of FIG. 9 but from the rear instead of from the front of the lower electrode. The electrode support 83'', however, in this case, is provided with guide pins 130' which extend from base 133'.

The helical springs 198a are spaced at the front and back of the electrode structure but the support is divided into separate pieces, a base 198 in the form of a channel and a rocker portion 199 fitting snugly within the channel in its lengthwise direction which is also the lengthwise direction of the electrode and a pivot pin 200 transverse of the channel, permitting adjustment of the electrode surface 82'. Base 133' is fixed to a piston rod 201 which extends through the end wall of a cylinder 202 to a piston 203 with suitable sealing rings. The cylinder 202 is supplied fluid for raising the piston by means of fluid feedline 204 whereby fluid is introduced to raise and removed to lower the piston and the structure supported on the piston rod. The structure below the movable assembly is conventional and similar to arrangements previously shown.

Figure 36:
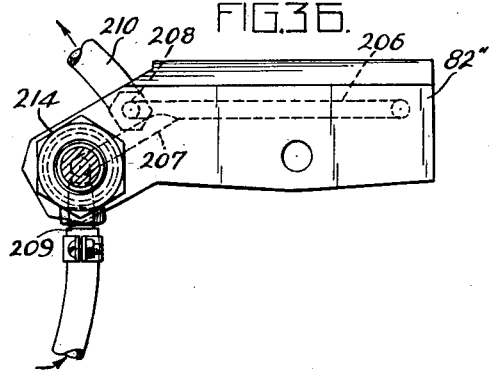
FIG. 36 is a detailed view of an electrode showing coolant channels.
Figure 37:
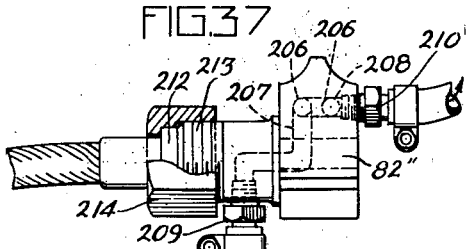
FIG. 37 is a front elevation of the structure of FIG. 36.

FIGS. 36 and 37 show a cooling arrangement for lower electrode 82". In this arrangement, fluid is introduced into parallel channels 206 at either side of the base of the electrode structure through conduits 207 and 208 by means of suitable hose attachments 209 and 210. These figures also show a modified form of electrical connection in which the terminal has a flat face 212 held against the flat-top of threaded terminal post 213 by a bolt 214 engaging the threads of the post and having a flange which pulls against a shoulder at the back of the terminal.

Various modifications and variations in structure have been described. Other such modifications and embodiments will occur to those skilled in the art and are intended to be within the scope and spirit of the present invention.

We claim:

1. In an electric welder an electrode structure comprising a pair of elongated electrodes arranged parallel and opposed to one another, means for supporting said electrodes and for moving the electrodes together, means including spring means between the electrode and its support for supporting one of the electrodes so that it can rotate relative to its support in the plane of the electrodes whereby, when the electrodes are brought together, all parts of the rotatably supported electrode will be urged by the spring means to bear with equal pre-set pressure against all parts of the other electrode when the electrodes are brought together with substantial pressure sufficient to effect the spring means.

2. In a welding apparatus, welding electrode structure comprising, a support frame for mounting the electrodes, a pair of opposed electrodes supported on relatively movable portions of the support frame, said portions being movable in such a direction that the electrodes are moved together and apart, means including spring means between the electrode and its support permitting rotation within the plane of movement of the contacting surfaces of the electrodes whereby when the electrodes move together the spring means will yield and urge the electrodes together with equal pressure at all points determined by the resilient means of contact when the electrodes are brought together with substantial pressure.

3. The structure of claim 2 in which one of the electrodes is supported on a mandrel which is a cantilever structure one end of which is unsupported so that tubes welded thereon may be removed therefrom.

4. The electrode structure of a welding assembly comprising a supporting frame including a fixed cantilever supported mandrel for forming tubular objects of sheet metal, an electrode supported on said forming mandrel, an electrode support movable relative to the frame, an electrode supported on said movable support opposed to the electrode supported on the mandrel, said electrodes being much longer than they are wide and arranged parallel and opposed to each other, coupling means including spring means between the electrode and its support, permitting rotation in the plane of the two electodes of the electrode on the movable portion of the frame whereby the electrode on the movable member when urged against the other electrode with substantial pressure can shift its position due to the yielding of the spring means until pressure is equal between all contacting points of the two electrodes along their lengths.

5. The structure of claim 4 in which the movable electrode is supported on a piston rod connected to a piston cooperating with a fluid cylinder on the supporting frame.

6. A can body welding apparatus in accordance with claim 4 in which the mandrel on which cans are formed and the elongated electrode associated therewith are at least the length of the can body on the mandrel against which the edges of the sheet may be overlapped, and the movable second electrode opposite the electrode on the mandrel is adapted for connection to a current supply for supplying a current density sufficient to produce a weld of desired degree.

7. The structure of claim 2 in which the movable electrode is rotatable about an axis perpendicular to the plane of movement of the electrodes.

8. The structure of claim 7 in which the axis is provided by a pin through the electrode support structure.

9. The structure of claim 2 in which the movable electrode is supported on a structure providing spring loading outside its four corners.

10. The structure of claim 2 in which the movable electrode is supported on a torsion bar support.

11. The structure of claim 10 in which the movable electrode is supported in a plurality of transversely extending torsion bars.

12. The structure of claim 10 in which the movable electrode is divided into lengthwise elements and each element is supported on a separate torsion bar.

13. The structure of claim 2 in which the movable electrode has a support structure including two mating parts one of which has a rocker bearing surface.

14. The structure of claim 1 in which a heating element is provided proximate to one of the electrodes to keep the temperature level thereof raised whereby to facilitate welding.

References Cited in the file of this patent

UNITED STATES PATENTS

| 645,066 | Brown et al. | Mar. 13, 1900 |
| 693,804 | Norton et al. | Feb. 8, 1902 |
| 1,229,700 | Auel | June 12, 1917 |
| 1,613,957 | Madden | Jan. 11, 1927 |
| 1,783,571 | Holt | Dec. 2, 1930 |
| 2,266,424 | Humphrey | Dec. 16, 1941 |
| 2,452,010 | Woodward | Oct. 19, 1948 |
| 2,472,849 | Paynter | June 14, 1949 |
| 2,578,832 | Pearson et al. | Dec. 18, 1951 |
| 2,774,858 | Heilshorn | Dec. 18, 1956 |
| 2,813,967 | Morrissey | Nov. 19, 1957 |